US011622309B2

United States Patent
Paladugu et al.

(10) Patent No.: US 11,622,309 B2
(45) Date of Patent: Apr. 4, 2023

(54) OPTIMIZATIONS TO SUPPORT ENHANCED HANDOVER PROCEDURES

(71) Applicant: QUALCOMM Incorporated, San Diego, CA (US)

(72) Inventors: Karthika Paladugu, San Diego, CA (US); Xipeng Zhu, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 16/993,171

(22) Filed: Aug. 13, 2020

(65) Prior Publication Data
US 2021/0051554 A1 Feb. 18, 2021

Related U.S. Application Data

(60) Provisional application No. 62/887,575, filed on Aug. 15, 2019.

(51) Int. Cl.
*H04W 36/18* (2009.01)
*H04W 36/32* (2009.01)
*H04W 36/08* (2009.01)

(52) U.S. Cl.
CPC ........ *H04W 36/18* (2013.01); *H04W 36/08* (2013.01); *H04W 36/32* (2013.01)

(58) Field of Classification Search
CPC ..... H04W 36/18; H04W 36/08; H04W 36/32; H04W 36/385; H04W 36/36; H04W 36/00835; H04W 36/24
See application file for complete search history.

(56) References Cited

U.S. PATENT DOCUMENTS

| 2012/0002637 | A1* | 1/2012 | Adjakple .......... H04W 36/0072 370/331 |
| 2012/0315914 | A1* | 12/2012 | Zhang ............. H04W 36/00835 455/439 |
| 2015/0079994 | A1 | 3/2015 | Ji et al. |
| 2018/0279193 | A1 | 9/2018 | Park et al. |
| 2020/0154326 | A1 | 5/2020 | Deenoo et al. |
| 2021/0295711 | A1* | 9/2021 | Hong ..................... G08G 5/003 |

FOREIGN PATENT DOCUMENTS

| CN | 107995663 A | 5/2018 |
| WO | 2018026401 A1 | 2/2018 |
| WO | WO-2020087432 A1 | 5/2020 |
| WO | WO-2020128966 A1 | 6/2020 |
| WO | WO-2020153884 A1 | 7/2020 |

OTHER PUBLICATIONS

International Search Report and Written Opinion—PCT/US2020/046427—ISA/EPO—dated Oct. 9, 2020.

(Continued)

*Primary Examiner* — Ankur Jain
(74) *Attorney, Agent, or Firm* — Patterson + Sheridan, L.L.P.

(57) ABSTRACT

Aspects of the present disclosure relate to wireless communications, and more particularly, techniques that may help optimize enhanced handover procedures, such as MBB and CHO handover procedures.

30 Claims, 9 Drawing Sheets

(56) References Cited

OTHER PUBLICATIONS

Nokia., et al.: "Activation of Make-Before-Break Handover", 3GPP Draft; R3-170481, 3rd Generation Partnership Project (3GPP), Mobile Competence Centre; 650, Route Des Lucioles; F-06921 Sophia-Antipolis Cedex; France vol. RAN WG3, No. Athens, Greece; Feb. 13, 2017-Feb. 17, 2017 Feb. 6, 2017 (Feb. 6, 2017), XP051224112, 2 pages, Retrieved from the Internet: URL: http://www.3gpp.org/ftp/tsg_ran/WG3_lu/TSGR3_95/Docs/ [retrieved on Feb. 6, 2017].

Nokia, et al., "Report from [104#61] [LTE/feMOB] Solution Directions for Minimizing User Data Interruption for UL/DL (Nokia)", 3GPP Draft, 3GPP TSG-RAN WG2 Meeting #105, R2-1900619 Report From [104#61 ] [LTEFEMOB] Solution Directions for Minimizing User Data Interruption, 3RD Generation Partnership Project (3GPP), Mobile Competence Centre, 650, Route Des Lucioles, F-06921, Sophia-Antipolis Cedex, France, vol. RAN WG2, No. Athens, Greece, Feb. 25, 2019-Mar. 1, 2019, Feb. 13, 2019 (Feb. 13, 2019), XP051597319, 49 pages.

\* cited by examiner

OPTIMIZATIONS TO SUPPORT ENHANCED HANDOVER PROCEDURES

PRIORITY CLAIM(S)

This application claims priority to and the benefit of U.S. Provisional Application No. 62/887,575, filed on Aug. 15, 2019, which is expressly incorporated by reference in its entirety as fully set forth below and for all applicable purposes.

BACKGROUND

Field of the Disclosure

Aspects of the present disclosure relate to wireless communications, and more particularly, to techniques that may help improve (optimize) certain enhanced handover procedures.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a source base station. The method generally includes taking part in enhancing a handover procedure of a user equipment (UE) to select a target base station for handover and taking one or more actions to enhance the handover procedure involving an interface via a core network entity for communication with the target base station.

Certain aspects of the present disclosure provide a method for wireless communications by a user equipment (UE). The method generally includes receiving information from a source base station for use in selecting a target base station as part of an enhanced handover procedure and taking one or more actions, based on the information, to enhance the handover procedure involving an interface via a core network entity for communication between the source base station and the target base station.

Certain aspects of the present disclosure provide a method for wireless communications by a core network entity. The method generally includes communicating with a source base station and taking one or more actions to enhance a handover procedure involving an interface via the core network entity for communication between the source base station and a target base station.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
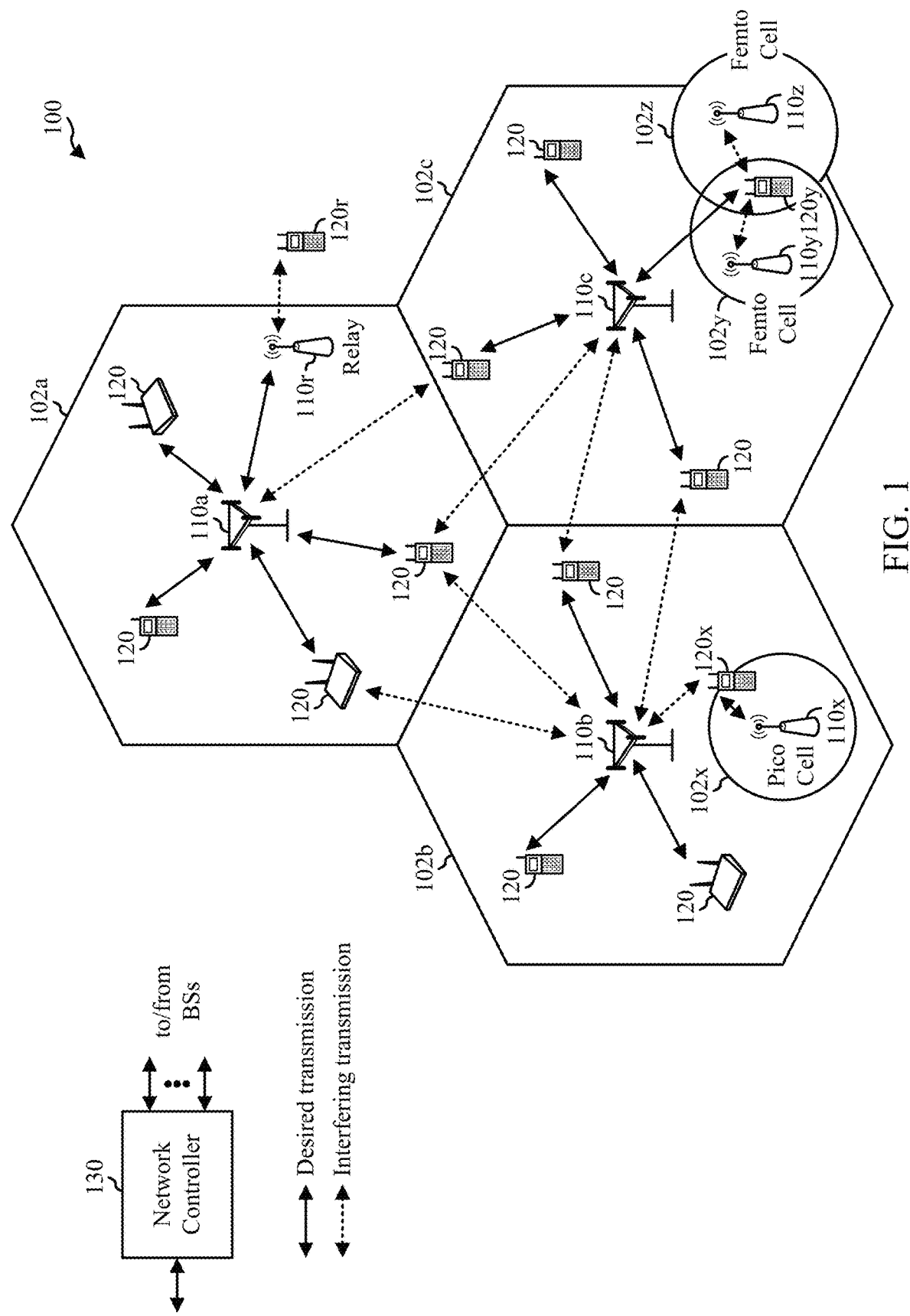
FIG. 1 is a block diagram conceptually illustrating an example telecommunications system, in accordance with certain aspects of the present disclosure.

Aspects of the present disclosure provide apparatus, methods, processing systems, and computer readable mediums for techniques that may help optimize certain enhanced handover procedures, such as make-before-break (MBB) and/or conditional handover (CHO) handover procedures.

Certain aspects of the present disclosure may be applied to new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, a first base station 110a may be a source base station configured to perform operations 300 shown in FIG. 3 to handover a UE 120 to another target base station 110b. The UE 120 may be configured to perform operations 400 of FIG. 4, while the target base station 110b may be configured to perform operations 500 of FIG. 5.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
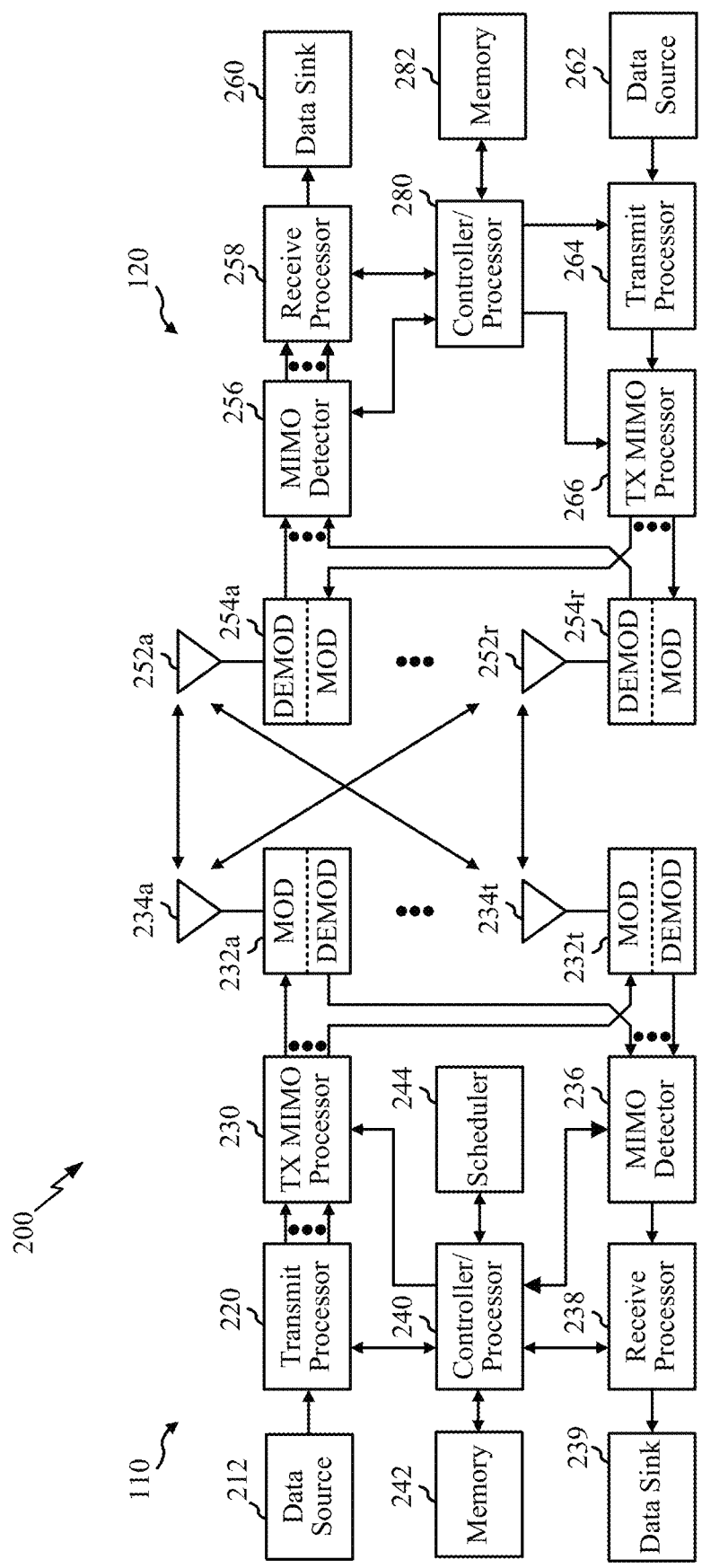
FIG. 2 is a block diagram conceptually illustrating a design of an example BS and user equipment (UE), in accordance with certain aspects of the present disclosure.

FIG. 2 shows a block diagram of a design of a gNB 110 and a UE 120, which may be one of the gNBs and one of the UEs in FIG. 1. For a restricted association scenario, the gNB 110 may be the macro gNB 110c in FIG. 1, and the UE 120 may be the UE 120y. The gNB 110 may also be gNB of some other type. The gNB 110 may be equipped with antennas 234a through 234t, and the UE 120 may be equipped with antennas 252a through 252r.

At the gNB 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the gNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the gNB 110. At the gNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the gNB 110 and the UE 120, respectively. The processor 240 and/or other processors and modules at the gNB 110 may perform or direct, e.g., the execution of various processes for the techniques described herein, e.g., the execution of the functional blocks illustrated in FIG. 6. The processor 280 and/or other processors and modules at the UE 120 may also perform or direct, e.g., the execution of the functional blocks illustrated in FIG. 5.

Example Optimizations for Enhanced Handover Procedures

Aspects of the present disclosure relate to wireless communications, and more particularly, techniques that may help optimize enhanced handover procedures, such as MBB and CHO handover procedures. In some cases, the optimization may help support make before break (MBB) handover and/or conditional handover (CHO) procedures involving N2 signaling. In some cases, improvements (e.g., optimizations or other solutions that may lead to enhanced performance) may include taking actions to help prioritize handover procedures to target base stations that may be able to utilize certain types of connections (e.g., Xn connections).

N2 signaling generally refers to signaling via the physical N2 interface between the NG-RAN gNodeB (gNB) and the Access and Mobility Management Function (AMF) in the 5G Core (5GC) network, as well as the logical N1 interface between the UE and the AMF. N2 generally serves as the control plane interface between an Access Network (NG-RAN or non-3GPP WLAN) and the 5GC network. N2 is generally concerned with connection management, UE context and PDU session management, and UE mobility management. Xn signaling generally refers to signaling using the Xn interface that exists between base stations (e.g., between gNBs). Xn generally refers to the network interface between NG-RAN nodes.

Currently, existing N2 handover signaling does not have capabilities to indicate MBB handover support. Accordingly, the techniques presented herein may help provide optimizations (or other improvements) to support MBB handover, CHO for Inter-NG RAN handover, and/or any handover that may rely on N2 signaling.

In certain cases of enhanced handover procedures, the source gNB and target gNB may be connected via Xn. In such cases, data forwarding may occur over Xn between the source and target gNBs. Aspects of the present disclosure may allow N2-based handoverprocedures to prioritize such gNBs to take advantage of the relatively lower latency associated with Xn signaling.

Conditional handover (CHO) configurations are typically sent to a UE before the actual handover event. The source gNB may prepare one or more candidate target cells for CHO. For each candidate target cell, the network may configure the UE with conditions to trigger a handover to the candidate target cell in the configuration to use to connect to the candidate target cell. When a handover condition is met, the UE initiates RACH to target cell. In such cases, the UE may not send a measurement report (MR) or wait for RRC Reconfiguration to execute the handover procedure.

When the source gNB and target gNB(s) are not connected over Xn, handover can be supported via N2 interface. In some cases, the gNBs connected via an N2 interface, may belong to different vendors, and/or separated over long distance. In these instances, the gNBs may be under different AMFs and/or connected to different UPFs. Existing N2 handover signaling may not have capabilities to indicate MBB handover support.

As noted above, in CHO procedures defined for X2 based candidate cell preparations, the source gNB may prepare and/or select the one or more candidate target cells based on the measurement criteria alone. If some of the candidate target cells belong to a different AMF, there may be some benefit in optimizing the source gNB and UE CHO execution logic to prioritize the candidate target cells under the same AMF. In some cases, data forwarding over N2 may benefit from optimizations that enable data forwarding for MBB and/or CHO handover procedures.

Figure 3:
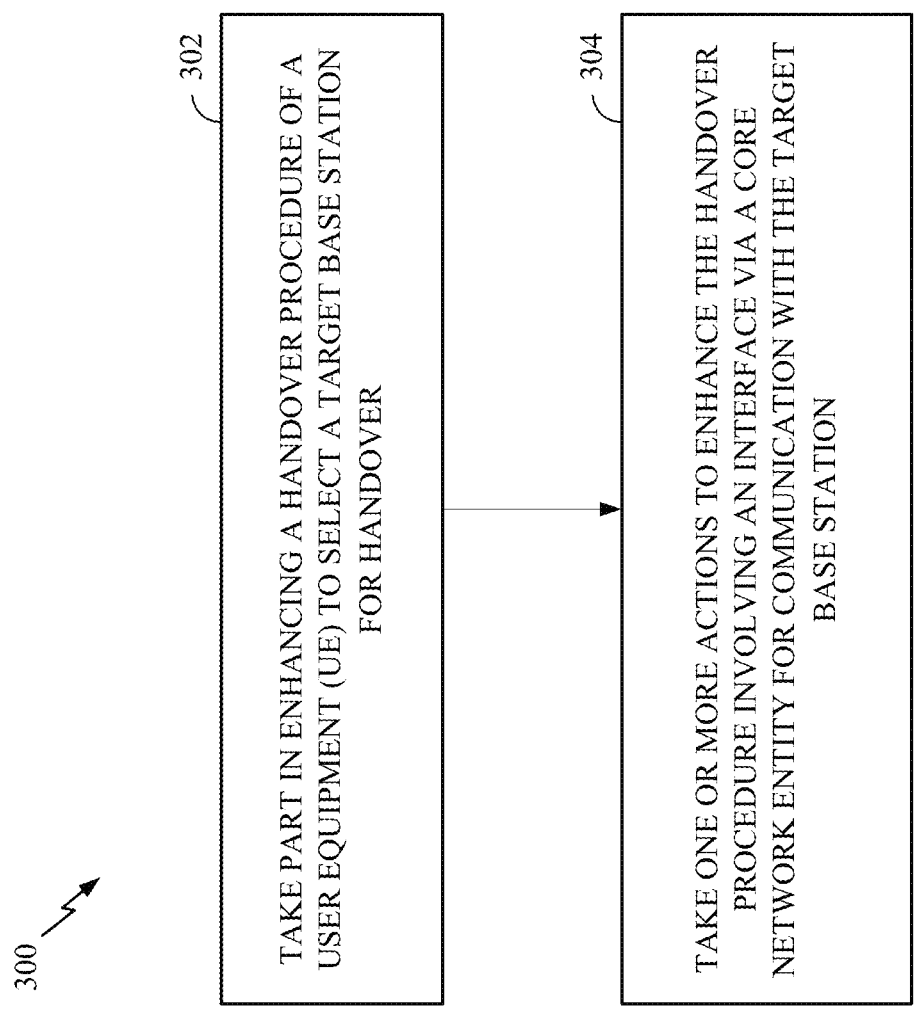
FIG. 3 illustrates example operations for wireless communication by a source base station, in accordance with certain aspects of the present disclosure.
Figure 4:
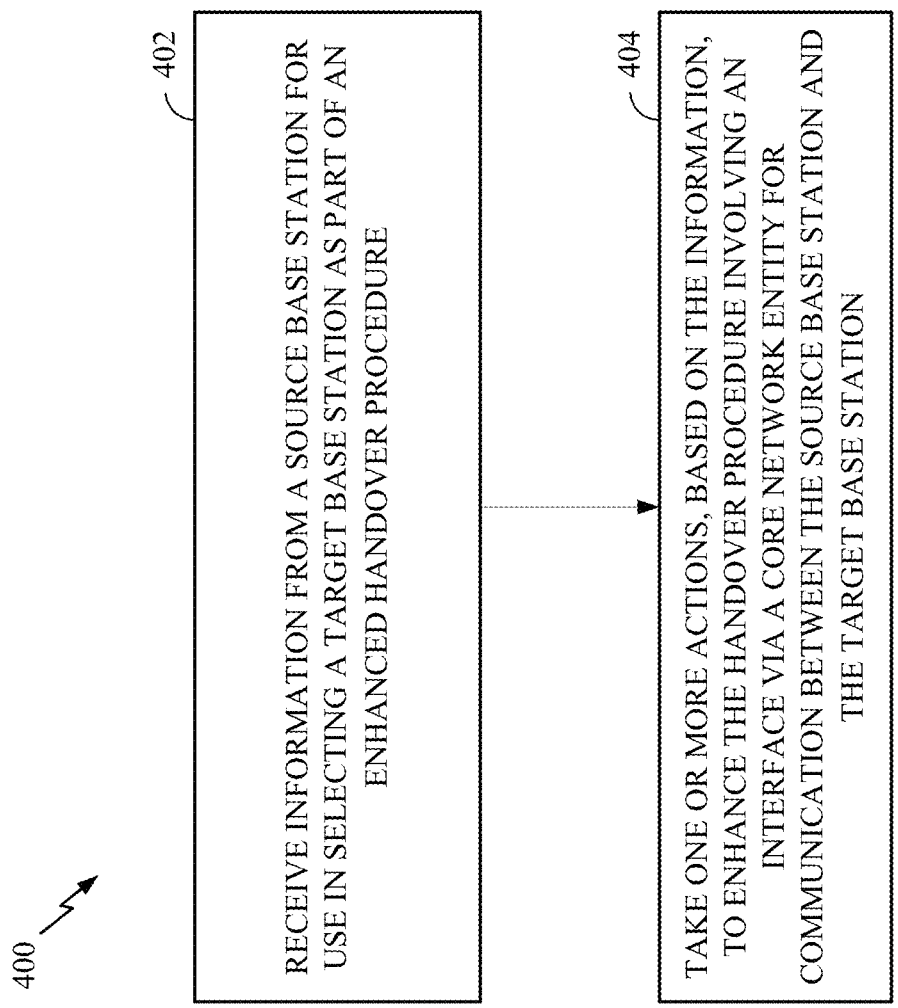
FIG. 4 illustrates example operations for wireless communication by a user equipment (UE), in accordance with certain aspects of the present disclosure.
Figure 5:
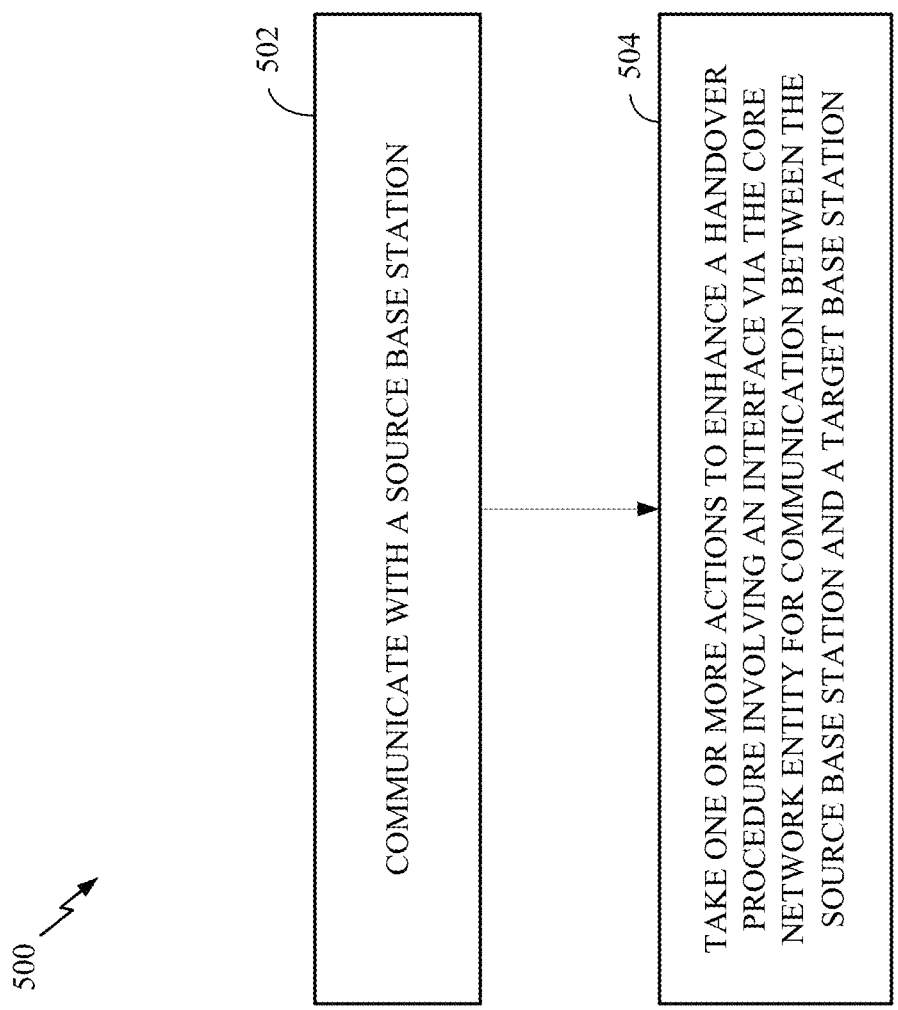
FIG. 5 illustrates example operations for wireless communication by a core network entity, in accordance with certain aspects of the present disclosure.

FIGS. 3, 4, and 5 are flow diagrams that illustrate example operations that may be performed by a source base station (source gNB), UE, and core network entity (e.g., AMF), respectively, to optimize/improve enhanced handover procedures, such as MBB and CHO.

FIG. 3 illustrates example operations 300 that may be performed by a source base station, in accordance with certain aspects of the present disclosure. Operations 300 may be performed, for example, by a gNB labeled S-NG-RAN in FIGS. 6 and 7 (or one or more of the processors for base station 110 thereof shown in FIG. 2) to handover a UE using an enhanced handover procedure.

Operations 300 begin, at 302, by taking part in enhancing a handover procedure of a user equipment (UE) to select a target base station for handover. At 304, the source base station takes one or more actions to enhance the handover procedure involving an interface via a core network entity for communication with the target base station.

FIG. 4 illustrates example operations 400 that may be performed by a UE, in accordance with certain aspects of the present disclosure. Operations 400 may be performed, for example, by a UE in FIGS. 6 and 7 (or one or more of the processors for a UE 120 thereof shown in FIG. 2) participating in an enhanced handover procedure.

Operations 400 begin, at 402, by receiving information from a source base station for use in selecting a target base station as part of an enhanced handover procedure. At 404, the UE takes one or more actions, based on the information, to enhance the handover procedure involving an interface via a core network entity for communication between the source base station and the target base station.

FIG. 5 illustrates example operations 500 that may be performed by a core network entity, in accordance with certain aspects of the present disclosure. Operations 500 may be performed, for example, by an AMF (e.g., S-AMF or T-AMF) shown in FIGS. 6 and 7.

Operations 500 begin, at 502, by communicating with a source base station. At 504, the core network entity takes one or more actions to enhance a handover procedure involving an interface via the core network entity for communication between the source base station and a target base station.

Figure 6:
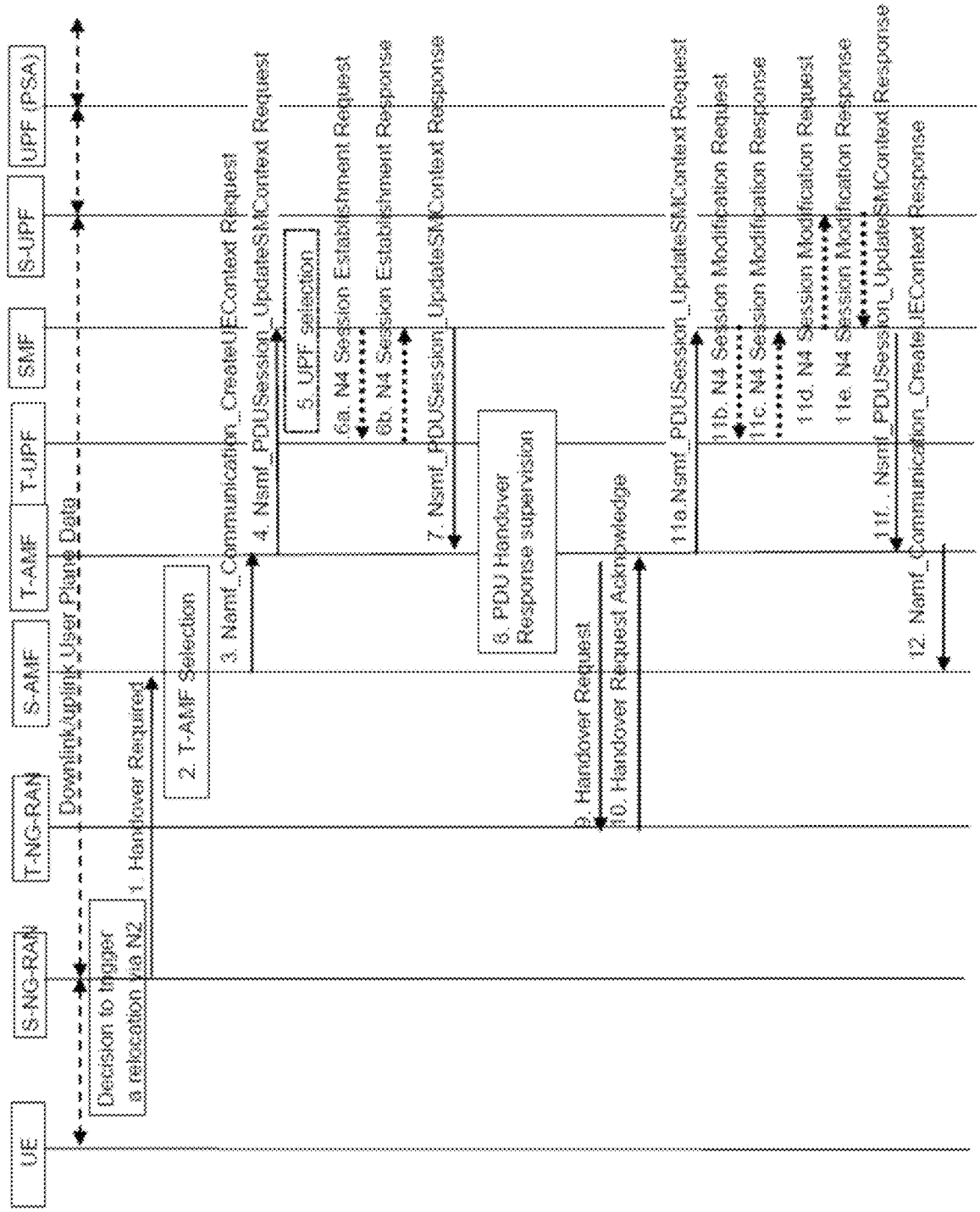
FIGS. 6-9 are call-flow diagram examples of enhanced handover procedures, in which certain aspects of the present disclosure may be utilized.
Figure 7:
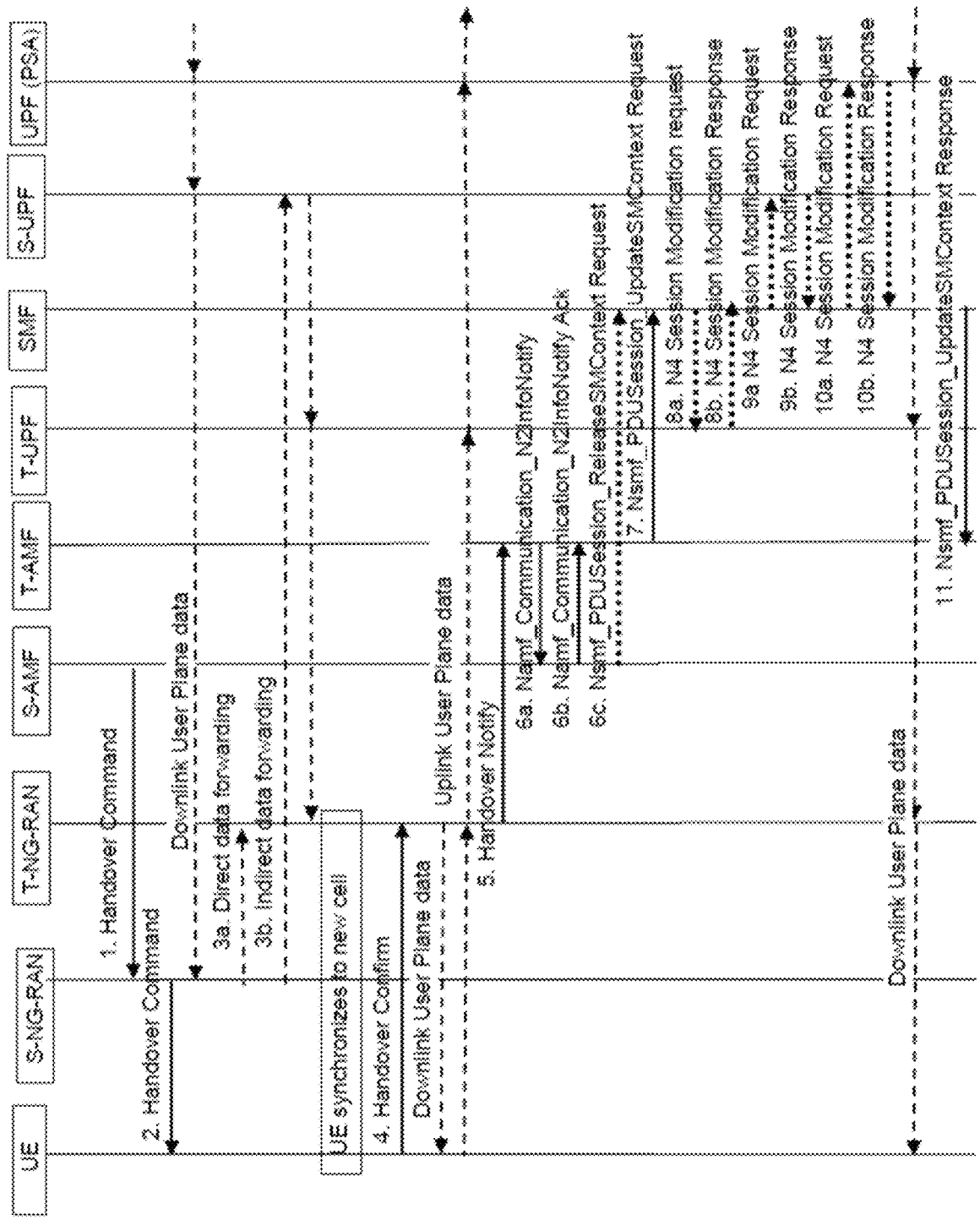

Various examples of operations of FIGS. 3, 4, and 5 above may be described with reference to the call flow diagrams of FIGS. 6 and 7, which illustrate preparation and execution phases for an enhanced inter-NG-RAN node N2 based handover and with reference to call flow diagrams of FIGS. 8 and 9, which illustrate preparation and execution phases for an EPS to 5GS N2 based handover.

Aspects of the present disclosure may help optimize MBB handover procedures by allowing a source gNB to give priority to cells under the same AMF and/or those with X2 connection higher priority to be selected as the target cell (e.g., which may result in less delay by avoiding AMF relocation). In some cases, a MBB handover indication may be included. For example, such an indication may be included by the source gNB in a HANDOVER REQUIRED message (e.g., as shown in FIGS. 6 and 8), or a HANDOVER COMMAND message (e.g., as shown in FIGS. 7 and 9). Similarly, a source AMF (or sole AMF if the source and target AMF are the same) may include the indication in an HANDOVER COMMAND, while a target AMF may include the indication in a HANDOVER REQUEST, and a target gNB may include the indication in a HANDOVER REQUEST ACKNOWLEDGE. The indication may be included, for example, in a new field or IE added to such messages as defined in Section 9.2.3 of TS 38.413.

Figure 8:
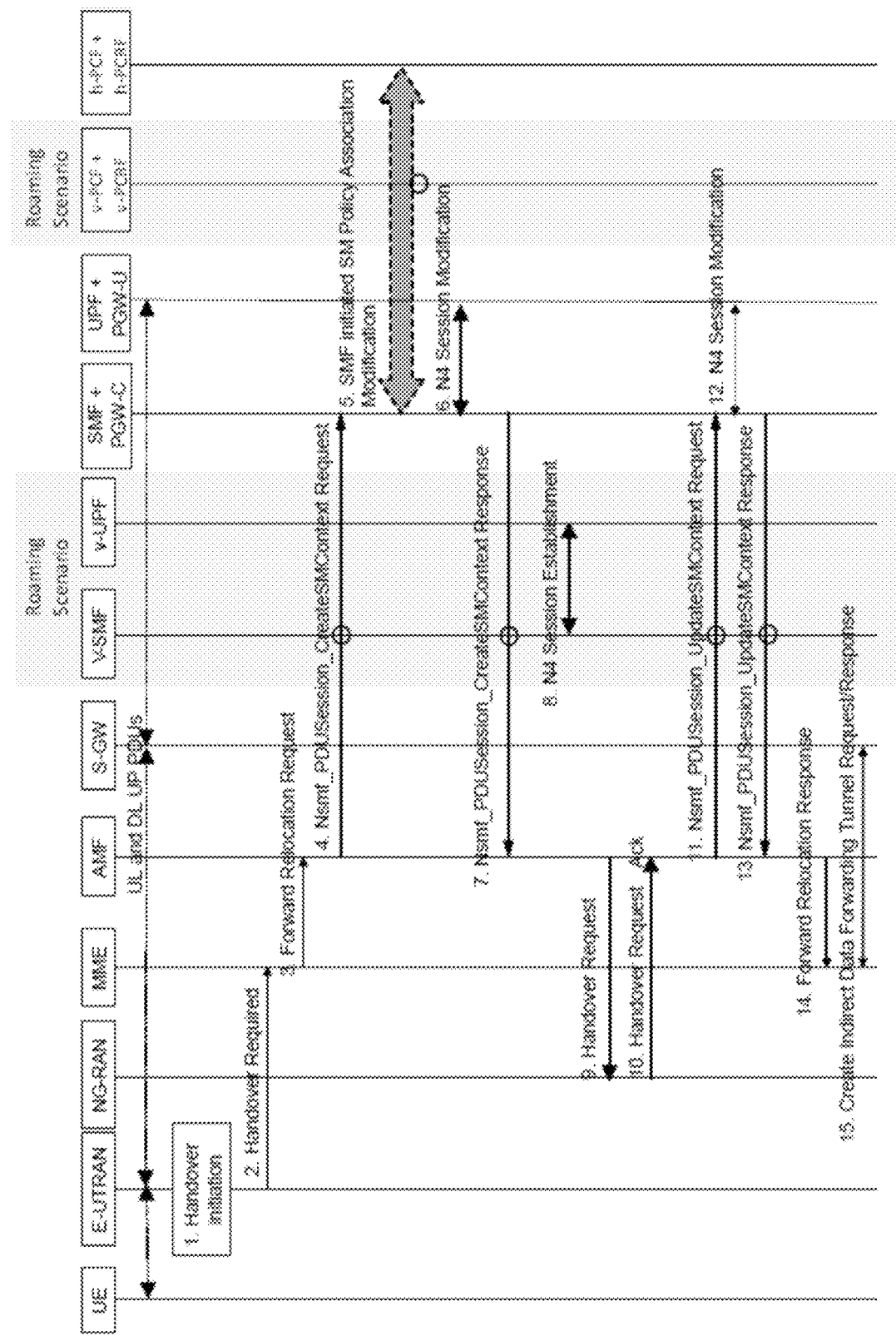
Figure 9:
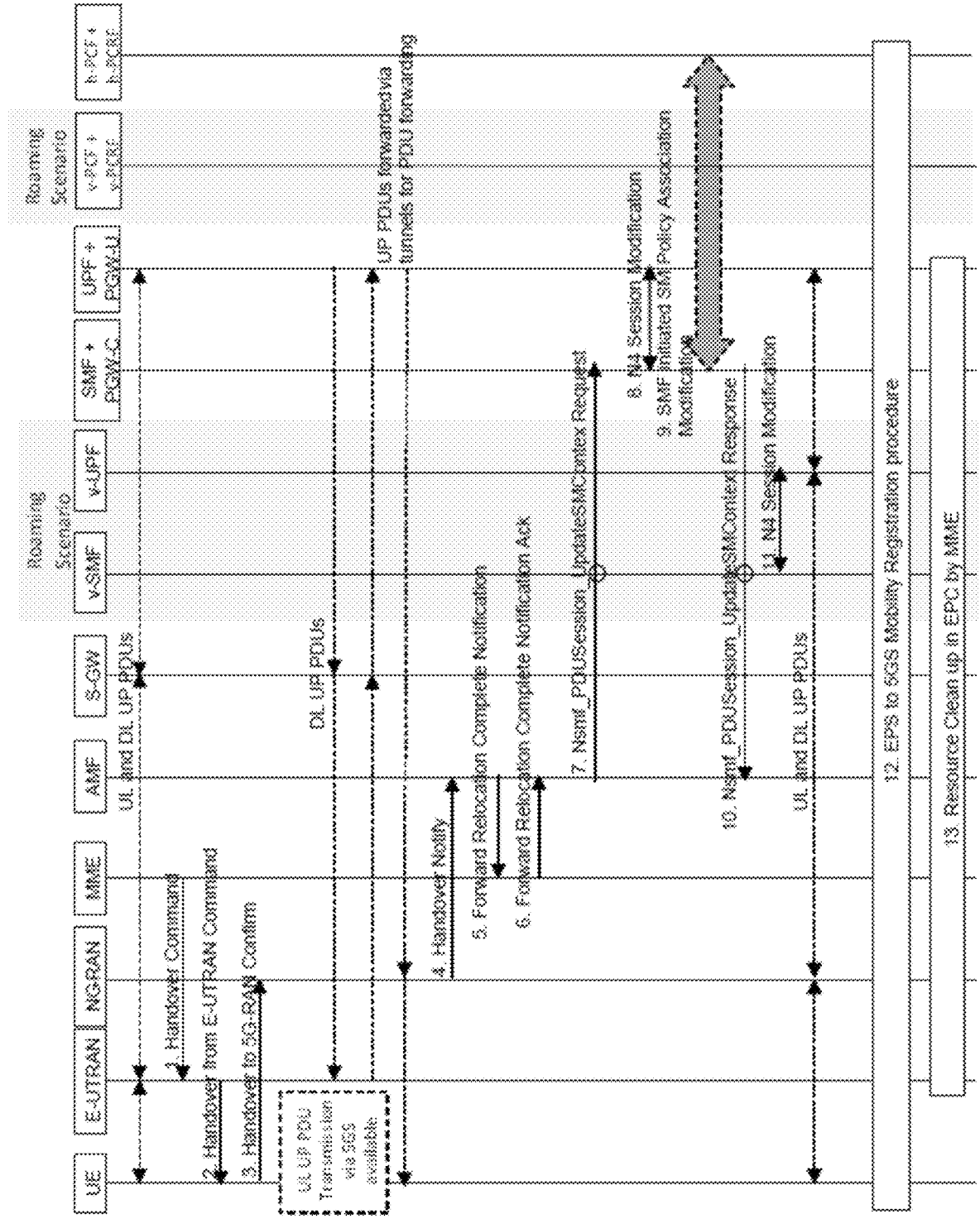

In some examples, the indications may also be included in the HANDOVER REQUIRED, HANDOVER COMMAND, HANDOVER REQUEST, and/or HANDOVER REQUEST ACKNOWLEDGE messages exchanged between the respective entities over N2 and 51 interfaces for LTE and/or NR MBB handover support (e.g., per FIGS. 8 and 9).

In some cases, data forwarding may be initiated as soon as an S-AMF sends the source gNB a RAN handover command (e.g., after step 1 in FIGS. 7 and 9), although the source gNB may still be serving the UE in the MBB scenario. If the source gNB did not initiate forwarding at that point, it may do initiate the forwarding at step 5, for example, by telling the AMF the UE could RACH on target cell and could successfully complete HO. The source AMF may communicate to the source (e.g., SOURCE NGRAN) to start delivering data. In case of N2 based signaling, MBB handover may be initiated by the source gNB in the below cases:
1) Step 1 of FIG. 7: similar to traditional HO. The source gNB may continue transmitting the same data still on the source gNB connection, as this is MBB handover.
2) After step 6a of FIG. 7: The S-AMF indicates via a new message (e.g., extend Handover Notify for this purpose or new message defined) to notify the s-gNB about handover success. The source gNB can start data forwarding (if not already started at step 1), or the source gNB can update the PDCP SN, UL PDCP status report for the already sent PDUs if started at step 1 to clean target gNB buffer.

Aspects of the present disclosure may help optimize CHO handover procedures by giving priority to the cells under the same AMF and/or those with X2 connection higher priority to be selected as the candidate target cell. In some cases, the gNB may configure some signal quality bias to a UE to prioritize the same AMF, the same gNB (CU), the same TAI (to make sure they have X2 interface). In some cases, the gNB may indicate, in a CHO command for each candidate target cell, whether the target cell belongs to different AMF, a different UPF, and/or a different gNB/CU by including respective IEs in CHO command (e.g., via an RRC reconfiguration message with CHO configuration for target cell).

In some cases, the source gNB may determine whether the target cell belongs to a different AMF (e.g., based on Operations Administration and Maintenance (OAM) configuration). In some cases, the S-AMF may inform the source gNB about the target cell information.

During CHO target cell selection, the UE could prioritize the target cell belonging to same AMF and/or those with X2 connection over those with an N2 connection and/or belonging to different AMF.

Even if the source gNB does not indicate that the target cell belongs to a different AMF, the UE can still determine an AMF ID of the source cell from 5G-Global Unique Temporary Identifier (GUTI). The UE may know a TAI list configured for the registration area. The UE may, in some examples, compare the target cell TAI included in the handover command with the TAI list to identify if the target cell belongs to the same AMF. The UE may use this information to prioritize cells under the same AMF. In other words, a UE may alter a conventional algorithm based on measurements and prioritize target cell belongs to the same AMF.

Data forwarding in case of N2 based CHO can be initiated by source gNB on the below cases:
After step 6a of FIG. 7: the S-AMF may indicate, via a new message (extend Handover Notify for this purpose or new message defined) to notify the s-gNB, handover success. The source gNB can start data forwarding at this time.

In some cases, target cell selection by the UE in CHO with multiple targets may also be optimized in an effort to avoid undesired reselection, which may be considered an important task of mobile network management. In other words, a UE or source gNB may take action to try and avoid the case where there is frequent mobility between a cell (and the beam which leads to degraded UE performance), causing the UE to rapidly switch between different beams and/or cells. In some cases, the source gNB, when sending information for CHO candidate targets, may apply some type of bias against cells where the UE might rapidly switch ("ping-pong") between beams and/or cells (e.g., based on a stored history for that UE possible over a certain period of time).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

EXAMPLE EMBODIMENTS

Embodiment 1: A method for wireless communications by a source base station, comprising taking part in enhancing a handover procedure of a user equipment (UE) to select a target base station for handover, and taking one or more actions to enhance the handover procedure involving an interface via a core network entity for communication with the target base station.

Embodiment 2: The method of Embodiment 1, wherein the enhanced handover procedure comprises a make-before-break (MBB) handover procedure in which the source base station continues to serve the UE until a connection with a target base station is made.

Embodiment 3: The method of Embodiment 2, wherein the one or more actions comprise giving priority to base stations associated with a common core network entity or having a connection to be selected as the target base station.

Embodiment 4: The method of Embodiment 2 or 3, wherein the one or more actions comprise providing an indication that the handover comprises a MBB handover procedure in at least one of a message sent on the interface, between the source base station and the core network entity, to prepare for the handover procedure, or a handover command message sent to the UE.

Embodiment 5: The method of any of Embodiments 2-4, wherein the source base station and the target base station support different radio access technologies (RATs).

Embodiment 6: The method of any of Embodiments 1-5, wherein the handover procedure comprises a conditional handover (CHO) procedure in which the source base station indicates one or more candidate target base stations for the UE to handover if one or more conditions are met.

Embodiment 7: The method of Embodiment 6, wherein the one or more actions comprise giving priority to base stations associated with a common core network entity or having a connection to be selected as the candidate target base stations.

Embodiment 8: The method of Embodiment 6 or 7, wherein the one or more actions comprise configuring a UE with one or more conditions that give priority to candidate target base stations associated with a common core network entity or having a connection.

Embodiment 9: The method of any of Embodiments 6-8, wherein the one or more actions comprise identifying, to the UE, which candidate target base stations are associated with a common core network entity or having a connection.

Embodiment 10: The method of any of Embodiments 6-9, wherein the one or more actions comprise reducing priority of a base station that the UE has moved away from within a time duration to be selected as the candidate target base stations.

Embodiment 11: The method of any of Embodiments 6-10, wherein the one or more actions comprise configuring a UE with one or more conditions that bias the UE against selecting a target base station where the UE has previously stayed for less than a time first duration within a second time duration.

Embodiment 12: The method of any of Embodiments 1-11, wherein the one or more actions comprise forwarding data to a target base station after receiving a message from the core network entity indicating success of the handover.

Embodiment 13: A method for wireless communications by a user equipment (UE), comprising receiving information from a source base station for use in selecting a target base station as part of an enhanced handover procedure; and taking one or more actions, based on the information, to enhance the handover procedure involving an interface via a core network entity for communication between the source base station and the target base station.

Embodiment 14: The method of Embodiment 13, wherein the handover procedure comprises a make-before-break (MBB) handover procedure in which the source base station continues to serve the UE until a connection with a target base station is made, and the information comprises an indication that the handover procedure comprises a MBB handover procedure received via a handover command message.

Embodiment 15: The method of Embodiment 14, wherein the source base station and the target base station support different radio access technologies (RATs).

Embodiment 16: The method of any of Embodiments 13-15, wherein the handover procedure comprises a conditional handover (CHO) procedure in which the source base station indicates one or more candidate target base stations for the UE to handover if one or more conditions are met.

Embodiment 17: The method of Embodiment 16, wherein the information comprises one or more conditions that give priority to candidate target base stations associated with a common core network entity or having a connection.

Embodiment 18: The method of Embodiment 16 or 17, wherein the information comprises an indication of which candidate target base stations are associated with a common core network entity or having a connection, and the one or more actions comprise giving priority to candidate target base stations associated with a common core network entity or having a connection.

Embodiment 19: The method of any of Embodiments 16-18, wherein the information comprises identifiers of the one or more candidate target base stations, and the one or more actions comprise determining, by the UE, which of the candidate target base stations are associated with a common core network entity or having a connection, and giving priority to the candidate target base stations are associated with a common core network entity or having a connection.

Embodiment 20: The method of any of Embodiments 16-19, wherein the one or more actions comprises one or more actions taken to avoid selecting a target base station that the UE has moved away from within a time duration.

Embodiment 21: The method of any of Embodiments 16-20, wherein the one or more actions comprises one or more actions taken to avoid selecting a target base station where the UE has previously stayed for less than a first time duration within second time duration.

Embodiment 22: A method for wireless communications by a core network entity, comprising communicating with a source base station, and taking one or more actions to enhance a handover procedure involving an interface via the core network entity for communication between the source base station and a target base station.

Embodiment 23: The method of Embodiment 22, wherein the enhanced handover procedure comprises a make-before-break (MBB) handover procedure in which the source base station continues to serve a user equipment (UE) until a connection with a target base station is made.

Embodiment 24: The method of Embodiment 23, wherein the one or more actions comprise at least one of receiving an indication, in a message from the source base station, that the handover procedure comprises an MBB handover procedure, or providing an indication, in a message to a target base station, that the handover procedure comprises an MBB handover procedure.

Embodiment 25: The method of Embodiment 23 or 24, wherein the one or more actions comprise providing an indication, to the source base station, a message indicating success of the handover procedure.

Embodiment 26: The method of any of Embodiments 23-25, wherein the source base station and target base station support different radio access technologies (RATs).

Embodiment 27: The method of any of Embodiments 22-26, wherein the handover procedure comprises a conditional handover (CHO) procedure in which the source base station indicates one or more candidate target base stations for a user equipment (UE) to handover if one or more conditions are met.

Embodiment 28: The method of Embodiment 27, wherein the one or more actions comprise providing the source base station with information sufficient to identify candidate target base stations associated with a common core network entity or having a connection.

Embodiment 29: The method of Embodiment 27 or 28, wherein the one or more actions comprise providing an indication, to the source base station, a message indicating success of the handover procedure.

Embodiment 30: An apparatus for wireless communications by a source base station, comprising means for taking part in enhancing a handover procedure of a user equipment (UE) to select a target base station for handover, and means for taking one or more actions to enhance the handover procedure involving an interface via a core network entity for communication with the target base station.

Embodiment 31: An apparatus for wireless communications by a user equipment (UE), comprising means for receiving information from a source base station for use in selecting a target base station as part of an enhanced handover procedure, and means for taking one or more actions, based on the information from the source base station, to enhance the handover procedure involving an interface via a core network entity for communication between the source base station and the target base station.

Embodiment 32: An apparatus for wireless communications by a core network entity, comprising means for communicating with a source base station, and means for taking one or more actions to enhance a handover procedure involving an interface via the core network entity for communication between the source base station and a target base station.

Embodiment 33: An apparatus for wireless communications by a source base station, comprising at least one processor and a memory configured to take part in enhancing a handover procedure of a user equipment (UE) to select a target base station for handover, and take one or more actions to enhance the handover procedure involving an interface via a core network entity for communication with the target base station.

Embodiment 34: An apparatus for wireless communications by a user equipment (UE), comprising at least one processor and a memory configured to receive information from a source base station for use in selecting a target base station as part of an enhanced handover procedure, and take one or more actions, based on the information, to enhance the handover procedure involving an interface via a core network entity for communication between the source base station and the target base station.

Embodiment 35: An apparatus for wireless communications by a core network entity, comprising at least one processor and a memory configured to communicate with a source base station, and take one or more actions to enhance a handover procedure involving an interface via the core network entity for communication between the source base station and a target base station.

Embodiment 36: A computer readable medium having instructions stored thereon for taking part in enhancing a handover procedure of a user equipment (UE) to select a target base station for handover, and taking one or more actions to enhance the handover procedure involving an interface via a core network entity for communication with the target base station.

Embodiment 37: A computer readable medium having instructions stored thereon for receiving information from a source base station for use in selecting a target base station as part of an enhanced handover procedure, and taking one or more actions, based on the information, to enhance the handover procedure involving an interface via a core network entity for communication between the source base station and the target base station.

Embodiment 38: A computer readable medium having instructions stored thereon for communicating with a source base station, and taking one or more actions to enhance a handover procedure involving an interface via a core network entity for communication between a source base station and a target base station.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a source base station, comprising:
    taking part in a handover procedure of a user equipment (UE) to select a target base station for handover; and
    taking one or more actions for the handover procedure involving an interface via a core network entity for communication of the source base station with the target base station, wherein the one or more actions comprise giving priority to a set of base stations associated with a common core network entity associated with the source base station and having X2 connection with other base stations over another set of base stations associated with a different core network entity.

2. The method of claim 1, wherein the handover procedure comprises a make-before-break (MBB) handover procedure in which the source base station continues to serve the UE until a connection with the target base station is made.

3. The method of claim 2, wherein the one or more actions further comprise providing an indication that the handover comprises a MBB handover procedure in at least one of:
a message sent on the interface, between the source base station and the core network entity, to prepare for the handover procedure; or
a handover command message sent to the UE.

4. The method of claim 2, wherein the source base station and the target base station support different radio access technologies (RATs).

5. The method of claim 1, wherein the handover procedure comprises a conditional handover (CHO) procedure in which the source base station indicates one or more candidate target base stations for the UE to handover if one or more conditions are met.

6. The method of claim 5, wherein the one or more actions further comprise configuring a UE with one or more conditions that give priority to candidate target base stations having a connection, wherein the connection is the X2 connection with other base stations.

7. The method of claim 5, wherein the one or more actions further comprise identifying, to the UE, which candidate target base stations have a connection, wherein the connection is the X2 connection with other base stations.

8. The method of claim 5, wherein the one or more actions further comprise reducing priority of a base station that the UE has moved away from within a time duration to be selected as the candidate target base stations.

9. The method of claim 5, wherein the one or more actions further comprise configuring the UE with one or more conditions that bias the UE against selecting the target base station where the UE has previously stayed for less than a time first duration within a second time duration.

10. The method of claim 1, wherein the one or more actions further comprise forwarding data to the target base station after receiving a message from the core network entity indicating success of the handover.

11. A method for wireless communications by a user equipment (UE), comprising:
receiving information from a source base station for use in selecting a target base station as part of a handover procedure, wherein the information comprises giving priority to a set of base stations associated with a common core network entity associated with the source base station and having X2 connection with other base stations over another set of base stations associated with a different core network entity; and
taking one or more actions, based on the information, for the handover procedure involving an interface via a core network entity for communication between the source base station and the target base station.

12. The method of claim 11, wherein:
the handover procedure comprises a make-before-break (MBB) handover procedure in which the source base station continues to serve the UE until a connection with the target base station is made; and
the information further comprises an indication that the handover procedure comprises a MBB handover procedure received via a handover command message.

13. The method of claim 12, wherein the source base station and the target base station support different radio access technologies (RATs).

14. The method of claim 11, wherein:
the handover procedure comprises a conditional handover (CHO) procedure in which the source base station indicates one or more candidate target base stations for the UE to handover if one or more conditions are met.

15. The method of claim 14, wherein the information further comprises the one or more conditions that give priority to candidate target base stations having a connection, wherein the connection is the X2 connection with other base stations.

16. The method of claim 14, wherein:
the information further comprises an indication of which candidate target base stations have a connection, wherein the connection is the X2 connection with other base stations; and
the one or more actions comprise giving priority to the candidate target base stations having the connection.

17. The method of claim 14, wherein:
the information further comprises identifiers of the one or more candidate target base stations; and
the one or more actions comprise
determining, by the UE, which of the candidate target base stations have a connection, wherein the connection is the X2 connection with other base stations; and
giving priority to the candidate target base stations having the connection.

18. The method of claim 14, wherein the one or more actions comprises one or more actions taken to avoid selecting the target base station that the UE has moved away from within a time duration.

19. The method of claim 14, wherein the one or more actions comprises one or more actions taken to avoid selecting the target base station where the UE has previously stayed for less than a first time duration within second time duration.

20. A method for wireless communications by a core network entity, comprising:
communicating with a source base station; and
taking one or more actions for a handover procedure involving an interface via the core network entity for communication between the source base station and a target base station, wherein the one or more actions comprise providing the source base station with information indicating to give priority to a set of base stations associated with a common core network entity associated with the source base station and having X2 connection with other base stations over another set of base stations associated with a different core network entity for selecting the target base station.

21. The method of claim 20, wherein:
the handover procedure comprises a make-before-break (MBB) handover procedure in which the source base station continues to serve a user equipment (UE) until a connection with the target base station is made.

22. The method of claim 21, wherein the one or more actions further comprise at least one of:
receiving an indication, in a message from the source base station, that the handover procedure comprises an MBB handover procedure; or
providing an indication, in a message to the target base station, that the handover procedure comprises an MBB handover procedure.

23. The method of claim 21, wherein the one or more actions further comprise providing an indication, to the source base station, a message indicating success of the handover procedure.

24. The method of claim 21, wherein the source base station and target base station support different radio access technologies (RATs).

25. The method of claim 20, wherein the handover procedure comprises a conditional handover (CHO) procedure in which the source base station indicates one or more candidate target base stations for a user equipment (UE) to handover if one or more conditions are met.

26. The method of claim 25, wherein the one or more actions further comprise providing the source base station with information sufficient to identify candidate target base stations having a connection, wherein the connection is the X2 connection with other base stations.

27. The method of claim 25, wherein the one or more actions further comprise providing an indication, to the source base station, a message indicating success of the handover procedure.

28. An apparatus for wireless communications by a source base station, comprising:
at least one processor and a memory configured to
take part in a handover procedure of a user equipment (UE) to select a target base station for handover; and
take one or more actions for the handover procedure involving an interface via a core network entity for communication of the source base station with the target base station, wherein the one or more actions comprise giving priority to a set of base stations associated with a common core network entity associated with the source base station and having X2 connection with other base stations over another set of base stations associated with a different core network entity.

29. An apparatus for wireless communications by a user equipment (UE), comprising:
at least one processor and a memory configured to
receive information from a source base station for use in selecting a target base station as part of a handover procedure, wherein the information comprises giving priority to a set of base stations associated with a common core network entity associated with the source base station and having X2 connection with other base stations over another set of base stations associated with a different core network entity; and
take one or more actions, based on the information, for the handover procedure involving an interface via a core network entity for communication between the source base station and the target base station.

30. An apparatus for wireless communications by a core network entity, comprising:
at least one processor and a memory configured to communicate with a source base station; and
take one or more actions for a handover procedure involving an interface via the core network entity for communication between the source base station and a target base station, wherein the one or more actions comprise providing the source base station with information indicating to give priority to a set of base stations associated with a common core network entity associated with the source base station and having X2 connection with other base stations over another set of base stations associated with a different core network entity for selecting the target base station.

* * * * *